United States Patent
Iwamaru et al.

(10) Patent No.: US 12,097,804 B2
(45) Date of Patent: Sep. 24, 2024

(54) IMAGE PROCESSING DEVICE, VEHICLE, IMAGE PROCESSING METHOD, AND STORAGE MEDIUM

(71) Applicant: HONDA MOTOR CO., LTD., Tokyo (JP)

(72) Inventors: Toraki Iwamaru, Tokyo (JP); Ryo Takechi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 17/899,049

(22) Filed: Aug. 30, 2022

(65) Prior Publication Data
US 2023/0216980 A1 Jul. 6, 2023

Related U.S. Application Data

(63) Continuation of application No. PCT/JP2020/014895, filed on Mar. 31, 2020.

(51) Int. Cl.
*B60R 1/20* (2022.01)
*B60R 1/27* (2022.01)
(Continued)

(52) U.S. Cl.
CPC ................ *B60R 1/20* (2022.01); *B60R 1/27* (2022.01); *B60R 1/29* (2022.01); *G06T 3/4038* (2013.01);
(Continued)

(58) Field of Classification Search
CPC .... B60R 1/20; B60R 1/27; B60R 1/29; G06T 3/4038; H04N 5/2628; H04N 5/265;
(Continued)

(56) References Cited

U.S. PATENT DOCUMENTS 7,161,616 B1 * 1/2007 Okamoto .................. B60R 1/00
348/E7.086
10,427,603 B2 * 10/2019 Ohta ....................... H04N 7/181
(Continued)

FOREIGN PATENT DOCUMENTS

DE 102018211396 A1 * 1/2020
EP 2410742 A1 1/2012
(Continued)

OTHER PUBLICATIONS

English translation of DE-102018211396-A1 (Year: 2018).*
(Continued)

*Primary Examiner* — John R Schnurr
(74) *Attorney, Agent, or Firm* — WHDA, LLP

(57) ABSTRACT

The present invention is an image processing device processing an image of a vehicle, comprising a first acquisition unit for acquiring an image showing a situation around the vehicle as a vehicle surrounding image, a second acquisition unit for acquiring information indicating a state of the vehicle, a third acquisition unit for acquiring an image of a driver of the vehicle as a driver image, and an image generation unit for generating an image of the vehicle as a vehicle image based on the information acquired by the second acquisition unit and generating a composite image by superimposing the vehicle image and the driver image on the vehicle surrounding image.

8 Claims, 8 Drawing Sheets

(51) Int. Cl.
    *B60R 1/29* (2022.01)
    *G06T 3/4038* (2024.01)
    *H04N 5/262* (2006.01)
    *H04N 5/265* (2006.01)
    *H04N 7/18* (2006.01)
    *H04N 23/90* (2023.01)

(52) U.S. Cl.
    CPC .......... *H04N 5/2628* (2013.01); *H04N 5/265* (2013.01); *H04N 7/181* (2013.01); *H04N 23/90* (2023.01)

(58) Field of Classification Search
    CPC .......... H04N 7/181; H04N 23/90; B62H 5/00; B62J 50/22
    See application file for complete search history.

(56) References Cited

U.S. PATENT DOCUMENTS

| | | | | |
|---|---|---|---|---|
| 10,611,308 | B2* | 4/2020 | Hatakeyama | H04N 23/63 |
| 10,857,974 | B2 | 12/2020 | Sawada | |
| 2010/0259372 | A1* | 10/2010 | Hideshiro | H04N 7/181 |
| | | | | 340/435 |
| 2012/0069187 | A1* | 3/2012 | Ozaki | G09G 5/14 |
| | | | | 348/148 |
| 2012/0113261 | A1* | 5/2012 | Satoh | B60R 1/00 |
| | | | | 348/148 |
| 2014/0292805 | A1* | 10/2014 | Yamada | G09G 5/00 |
| | | | | 345/629 |
| 2017/0103160 | A1 | 4/2017 | Hynes | |
| 2019/0009720 | A1* | 1/2019 | Omiya | G08G 1/165 |
| 2019/0244324 | A1 | 8/2019 | Watanabe et al. | |
| 2020/0084395 | A1* | 3/2020 | Watanabe | B60R 1/27 |
| 2020/0276933 | A1* | 9/2020 | Chen | H04N 7/181 |
| 2021/0053529 | A1 | 2/2021 | Sawada | |

FOREIGN PATENT DOCUMENTS

| | | |
|---|---|---|
| JP | 10-215407 A | 8/1998 |
| JP | 2013-177016 A | 9/2013 |
| JP | 2015-76062 A | 4/2015 |
| JP | 2018-139070 A | 9/2018 |
| WO | WO-2022070618 A1 * | 4/2022 |

OTHER PUBLICATIONS

Office Action dated Dec. 12, 2023, issued in counterpart EP Application No. 20929198.8. (6 pages).

International Search Report dated Jul. 21, 2020, issued in counterpart International Application No. PCT/JP2020/014895 with English Translation. (5 pages).

Extended (Supplementary) European Search Report dated Mar. 22, 2023, issued in counterpart EP application No. 20929198.8. (7 pages).

* cited by examiner

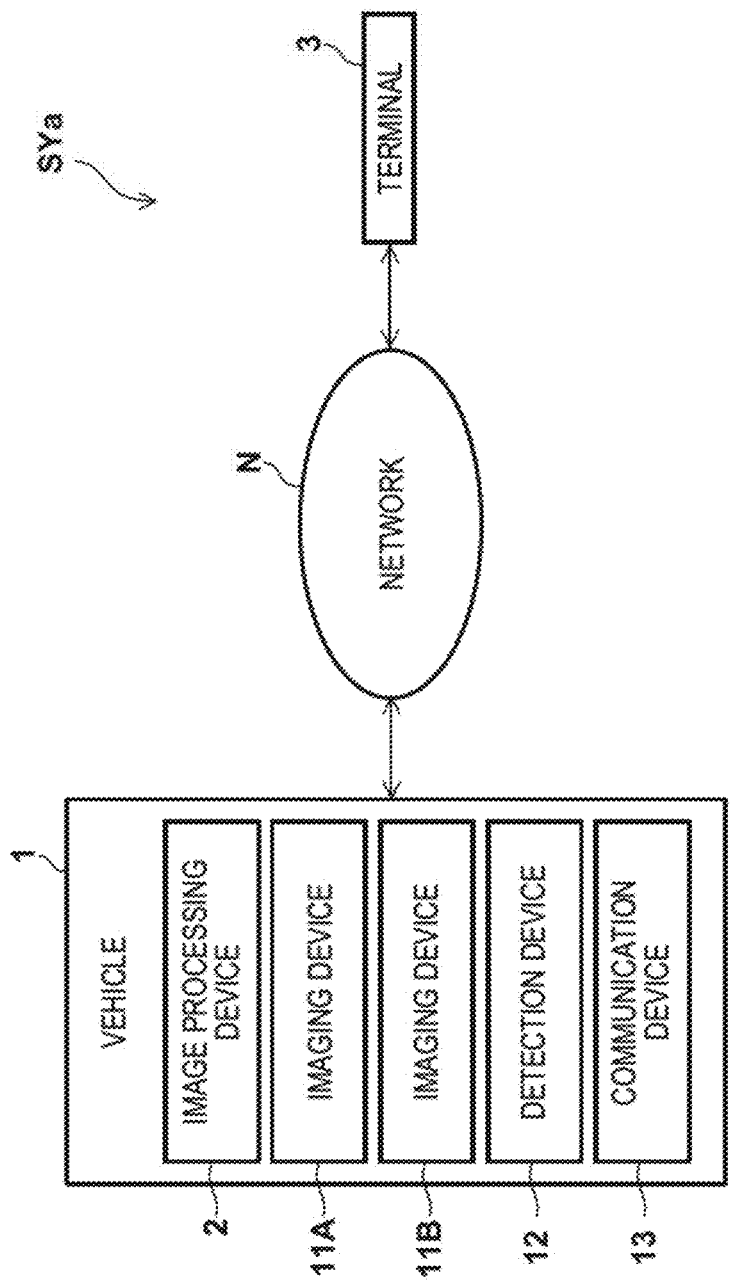

IMAGE PROCESSING DEVICE, VEHICLE, IMAGE PROCESSING METHOD, AND STORAGE MEDIUM

CROSS-REFERENCE TO RELATED APPLICATION(S)

This application is a continuation of International Patent Application No. PCT/JP2020/014895 filed on Mar. 31, 2020, the entire disclosure of which is incorporated herein by reference.

TECHNICAL FIELD

The present invention mainly relates to an image processing device.

BACKGROUND ART

Patent Literature 1 describes an image processing technology for providing a virtual viewpoint in an image showing a state of a vehicle and the surroundings of the vehicle, and causing the image to be visually recognized while changing the virtual viewpoint. Patent Literature 1 discloses theft prevention as a usage example of such a technology.

CITATION LIST

Patent Literature

PTL1: Japanese Patent Laid-Open No. 2015-76062

SUMMARY OF INVENTION

Technical Problem

Further technical improvement may be required in order to further diversify applications of images obtained through the image processing technology.

An exemplary objective of the present invention is to make it possible to relatively easily realize diversification of applications of images obtained through the above-described image processing technology.

Solution to Problem

A first aspect of the present invention is an image processing device processing an image of a vehicle, the image processing device comprising a first acquisition unit for acquiring an image showing a situation around the vehicle as a vehicle surrounding image, a second acquisition unit for acquiring information indicating a state of the vehicle, a third acquisition unit for acquiring an image of a driver of the vehicle as a driver image, and an image generation unit for generating an image of the vehicle as a vehicle image based on the information acquired by the second acquisition unit and generating a composite image by superimposing the vehicle image and the driver image on the vehicle surrounding image.

Advantageous Effects of Invention

The present invention is advantageous for diversification of applications of images obtained by the above-described image processing technology.

BRIEF DESCRIPTION OF DRAWINGS

FIG. 6A is a schematic diagram illustrating another exemplary configuration of the image display system.

DESCRIPTION OF EMBODIMENTS

Figure 1:
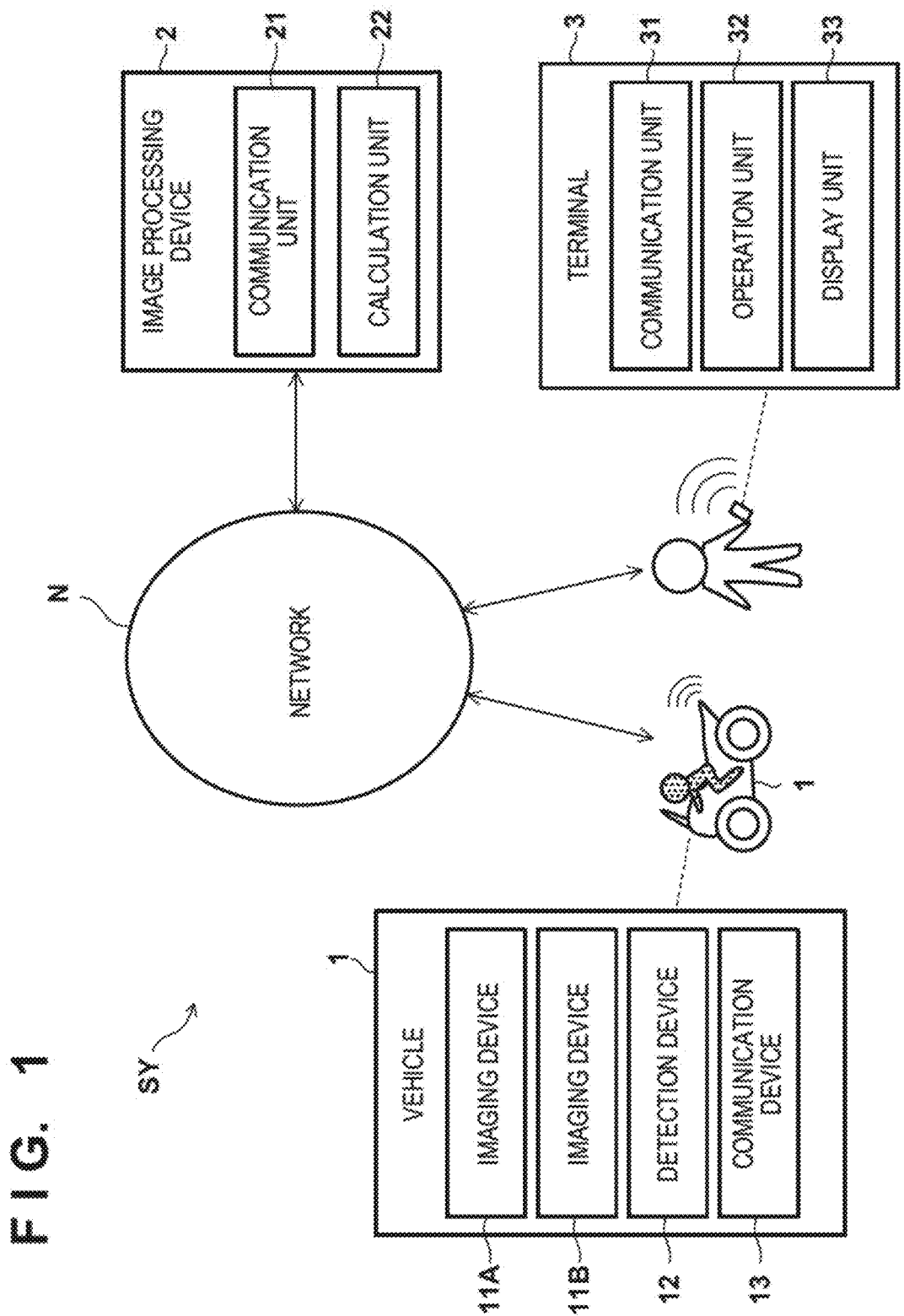
FIG. 1 is a schematic diagram illustrating an exemplary configuration of an image display system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(Example of Image Display System)

FIG. 1 is a schematic diagram illustrating an exemplary configuration of an image display system SY according to an embodiment. The image display system SY includes a vehicle 1, an image processing device 2, and a terminal 3 which are assumed to be able to communicate with each other via a network N in the present embodiment.

The vehicle 1 is a straddled vehicle in the present embodiment. Note that a straddle type vehicle is a type of vehicle that a driver boards by straddling a vehicle body, and the concept of the straddle type vehicle includes not only a typical motorcycle (including a scooter type vehicle) but also, for example, an all-terrain vehicle (ATV) such as a three-wheeled vehicle (a vehicle with one front wheel and two rear wheels or a vehicle with two front wheels and one rear wheel) and a four-wheeled buggy. As another embodiment, the vehicle 1 may be a passenger vehicle. The vehicle 1 includes imaging devices 11A, imaging devices 11B, a detection device 12, and a communication device 13.

Figure 2:
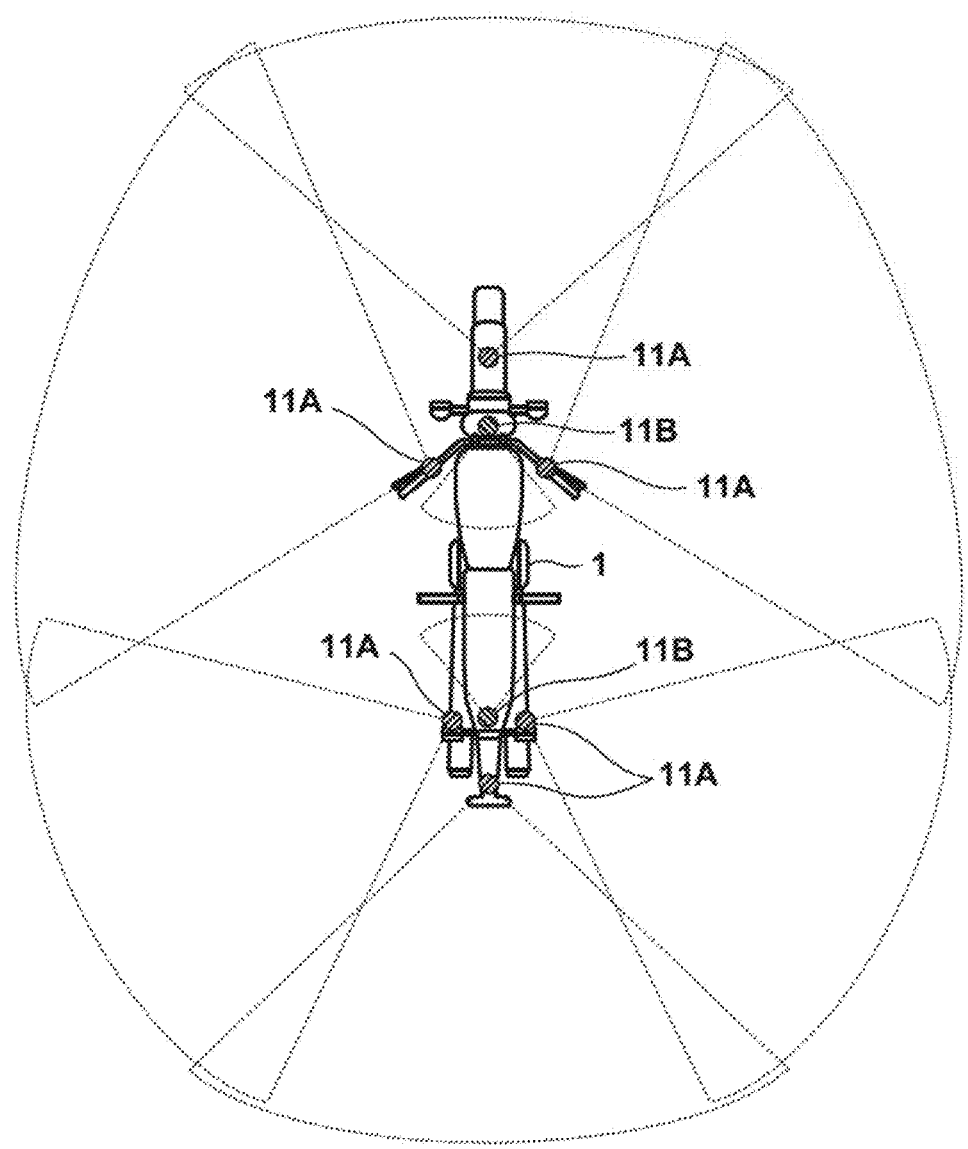
FIG. 2 is a schematic diagram illustrating an exemplary configuration of a vehicle.

FIG. 2 is a schematic diagram illustrating an exemplary functional configuration of the vehicle 1.

The plurality of imaging devices 11A are provided in the surroundings of the vehicle body to be able to capture an image showing a state of the surroundings of the vehicle 1. The plurality of imaging devices 11A are provided so that imaging areas of the imaging devices 11A include the entire surroundings of the vehicle 1. That is, the plurality of imaging devices 11A are provided such that imaging areas of two imaging devices 11A adjacent to each other partially overlap each other. In the drawing, an orientation direction of the imaging devices 11A is schematically illustrated by a dotted line, but an actual detection range of the imaging devices 11A is wider than a range illustrated in the drawing.

The imaging devices 11B are provided both in front of and behind the driver's seat to be able to image the driver from each of the front and the rear. In the drawing, similarly to the imaging devices 11A, the orientation direction of the imaging devices 11B is schematically illustrated by a dotted line, but the actual detection range of the imaging devices 11B is wider than the range illustrated in the drawing. Accordingly, as will be described below in detail, an appearance, an attitude, a behavior, and the like of the driver can be imaged.

Known cameras including a CCD/CMOS image sensor or the like may be used as the imaging devices 11A and 11B. In the present embodiment, as an example, monocular cameras are used in order to reduce cost required for the imaging devices 11A and 11B.

The detection device 12 is provided at each portion of the vehicle body to be able to detect a state of the vehicle 1. Here, in the present embodiment, the state of the vehicle 1 includes a vehicle speed, a steering angle, an attitude of the vehicle body, and a state of the lamp body (a headlight, a taillight, a blinker, and the like).

The vehicle speed is detected based on, for example, a revolution speed of a wheel per unit time, and this can be realized by using a known speed sensor. The steering angle is detected based on, for example, the direction of the steering wheel with respect to the vehicle body (alternatively, the direction of a handlebar with respect to the vehicle body), and this can be realized by using a known steering angle sensor. The attitude of the vehicle body is detected based on, for example, a direction of the vehicle body with respect to a direction of gravity, and this can be realized by using a known acceleration sensor. The state of the lamp body is detected based on, for example, a conduction state of the light source, and this can be realized by using a known ammeter.

The communication device 13 transmits imaging results from the imaging devices 11A and 11B and a detection result from the detection device 12 to the image processing device 2 via the network N. The communication device 13 may be expressed as a transceiver device or the like or may be simply expressed as a transmission device in the present embodiment. Although details will be described below, the imaging result from the imaging devices 11A indicates an image (hereinafter referred to as a vehicle surrounding image 9A) indicating a state around the vehicle 1. The imaging result from the imaging devices 11B indicates an image of the driver (hereinafter referred to as a driver image 9B). The detection result from the detection device 12 indicates information (hereinafter referred to as vehicle information 9i) indicating the state of the vehicle 1.

Referring again to FIG. 1, the image processing device 2 includes a communication unit 21 and a calculation unit 22. The communication unit 21 enables the image processing device 2 to communicate with each of the vehicle 1 and the terminal 3 via the network N. The calculation unit 22 performs predetermined calculation processing including image processing, as will described in detail below. In the present embodiment, the calculation unit 22 is a processor including a CPU and a memory, and a function of the calculation unit 22 is realized by executing a predetermined program. That is, the program may be read via a network or a storage medium and executed on a computer.

In another embodiment, the calculation unit 22 may be configured as a semiconductor device such as a programmable logic device (PLD) or an application specific semiconductor integrated circuit (ASIC). That is, the function of the calculation unit 22 can be realized by either hardware or software.

In the present embodiment, the terminal 3 is a mobile terminal (for example, a smartphone) and includes a communication unit 31, an operation unit 32, and a display unit 33. The user of the terminal 3 may be a driver of the vehicle 1 or a third party different from the driver. The communication unit 31 enables the terminal 3 to communicate with the image processing device 2 via the network N. Although details will be described below, the operation unit 32 can receive an operation input from the user and the display unit 33 can display an image. The operation unit 32 and the display unit 33 may be integrated (for example, a touch panel display may be used) or may be individually provided.

Although details will be described below, in such an image display system SY, the vehicle 1 can communicate with the image processing device 2 and transmit the imaging results from the imaging devices 11A and 11B and the detection result from the detection device 12 to the image processing device 2. The image processing device 2 performs predetermined image processing with the calculation unit 22 based on the imaging results and the detection result, generates a composite image (hereinafter referred to as a composite image 9X), and transmits the composite image 9X to the terminal 3. The user can visually recognize the composite image 9X on the display unit 33 while performing an operation input to the operation unit 32 on the terminal 3.

(Example of Image Processing Method)

Figure 3:
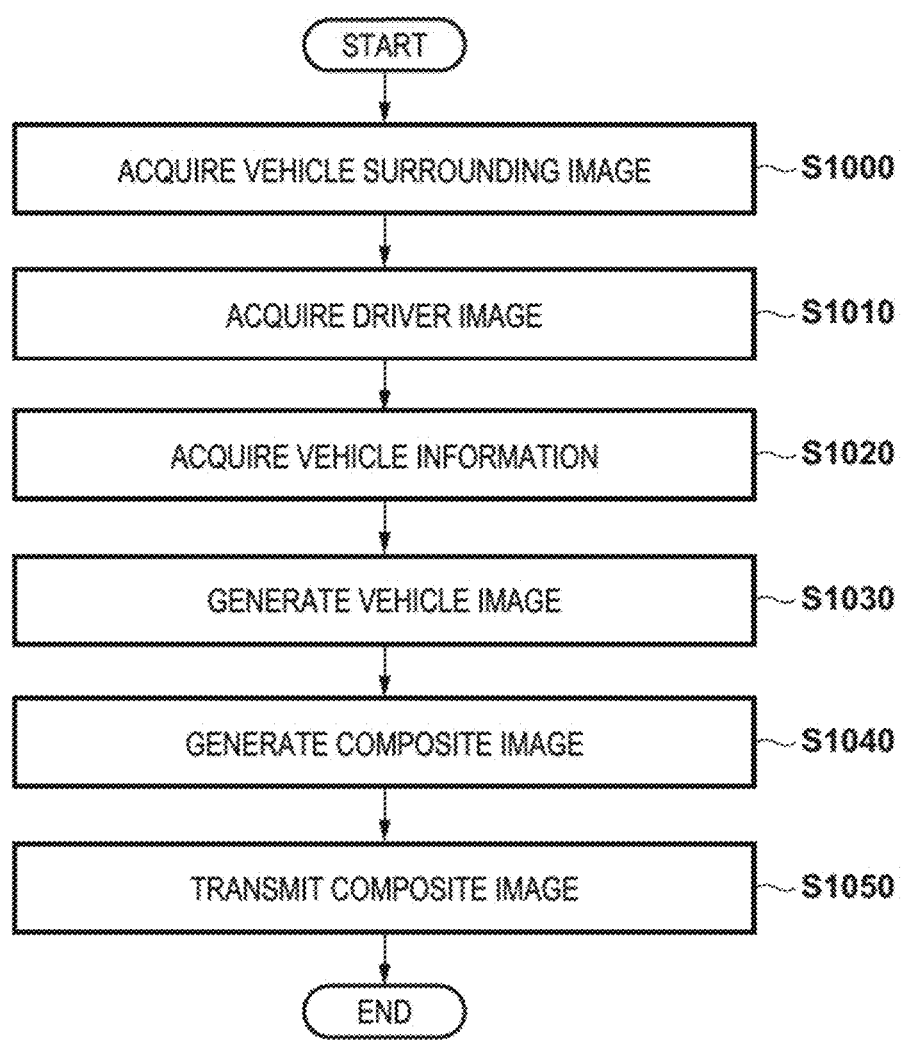
FIG. 3 is a flowchart illustrating an example of an image processing method.

FIG. 3 is a flowchart illustrating an example of an image processing method of generating the composite image 9X. Content of this flowchart is mainly performed by the calculation unit 22. An overview of the content is to generate an image (hereinafter referred to as a vehicle image 9C) of the vehicle 1 based on the vehicle information 9i and to generate the composite image 9X using the images 9A to 9C. The flowchart may be executed when the vehicle 1 is being used (during traveling), or may be executed after use of the vehicle 1 (during non-traveling).

In step S1000 (hereinafter simply referred to as "S1000" and the same applies to the other steps as will be described below), the vehicle surrounding image 9A is acquired from the vehicle 1. As described above, the vehicle surrounding image 9A is obtained by the plurality of imaging devices 11A, and the plurality of imaging devices 11A are provided in the surrounding portions of the vehicle body such that the imaging area includes the entire area around the vehicle 1. Accordingly, the vehicle surrounding image 9A shows a situation of the entire area around the vehicle 1 and is obtained in a so-called panoramic view (360-degree panoramic view). Therefore, the image processing on the vehicle surrounding image 9A can be relatively easily performed by using a spherical coordinate system.

In S1010, the driver image 9B is acquired from the vehicle 1. As described above, the driver image 9B is obtained by the pair of imaging devices 11B provided in front of and behind the driver's seat, and the pair of imaging devices 11B is provided to be able to image the driver from the front and the rear. Accordingly, the driver image 9B indicates a driving mode of the driver, such as an appearance (for example, skeleton and cloth (a helmet is included in addition to wear)), an attitude (in the case of a still image), and a behavior (in the case of a moving image) of the driver. Accordingly, the image processing on the driver image 9B can be relatively easily performed by using a 3-dimensional coordinate system based on a predetermined human body model.

In S1020, the vehicle information 9i is acquired from the vehicle 1. As described above, the vehicle information 9i is obtained by the detection device 12 provided in each portion of the vehicle body to be able to detect a state of the vehicle 1. The state of the vehicle 1 includes a vehicle speed, a steering angle, an attitude of the vehicle body, and a state of the lamp body.

In S1030, the vehicle image 9C is generated based on the vehicle information 9$i$. Since the vehicle information 9$i$ indicates the vehicle speed, the steering angle, the attitude of the vehicle body, and the state of the lamp body, an image of the vehicle 1 in a state corresponding thereto is generated as the vehicle image 9C. Accordingly, the image processing on the vehicle image 9C can be relatively easily performed by using the 3-dimensional coordinate system which is based on the corresponding vehicle model.

In S1040, the images 9B and 9C are superimposed on the vehicle surrounding image 9A to generate the composite image 9X. As described above, in the present embodiment, the vehicle surrounding image 9A is processed with the spherical coordinate system, and the driver image 9B and the vehicle image 9C are processed with the 3-dimensional coordinate system.

Here, the 3-dimensional coordinate system can be typically indicated by coordinates (x, y, z) using a distance x from a coordinate center to a target to in the front-and-rear direction of the vehicle body, a distance y from the coordinate center to the target in the left-and-right direction of the vehicle body, and a distance z from the coordinate center to the target in the up-and-down direction of the vehicle body. The spherical coordinate system can be typically indicated by coordinates (r, θ, φ) using a distance r from the coordinate center to the target, an angle θ formed by a line passing between the coordinate center and the target and the up-and-down direction of the vehicle body, and an angle φ formed by a line passing between the coordinate center and the target and the front-and-rear direction of the vehicle body.

Figure 4A:
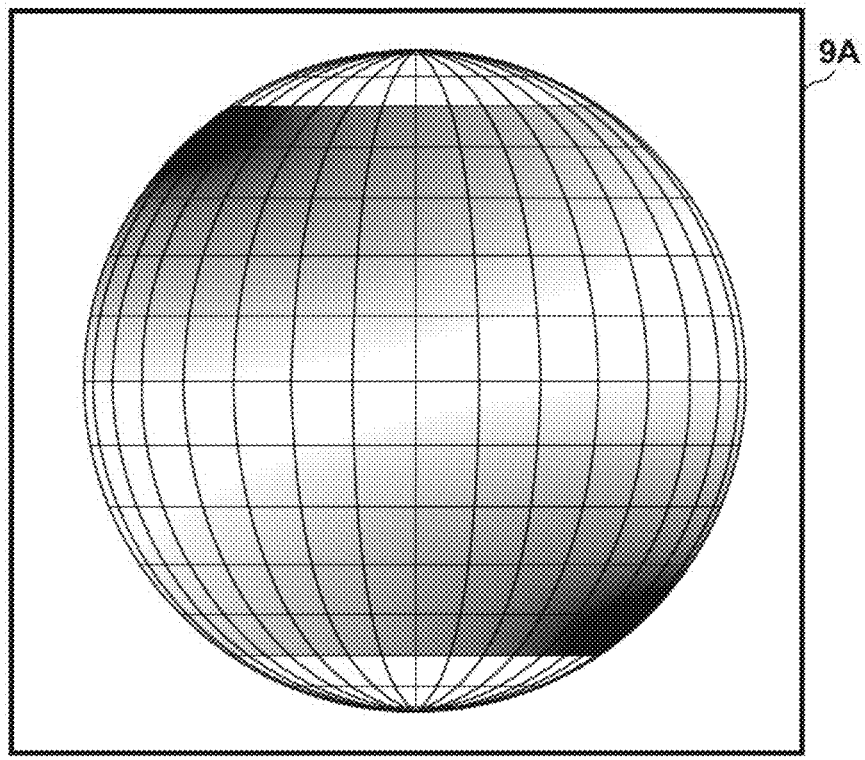
FIG. 4A is a schematic diagram illustrating a vehicle surrounding image.

FIG. 4A is a schematic diagram illustrating the vehicle surrounding image 9A. The vehicle surrounding image 9A is processed with the spherical coordinate system and drawn at a position at the distance r from the coordinate center. In other words, the vehicle surrounding image 9A which is a panoramic view is drawn on the inner wall of a sphere that has the radius r. The radius r may be set to be a position outside of the vehicle 1.

Figure 4B:
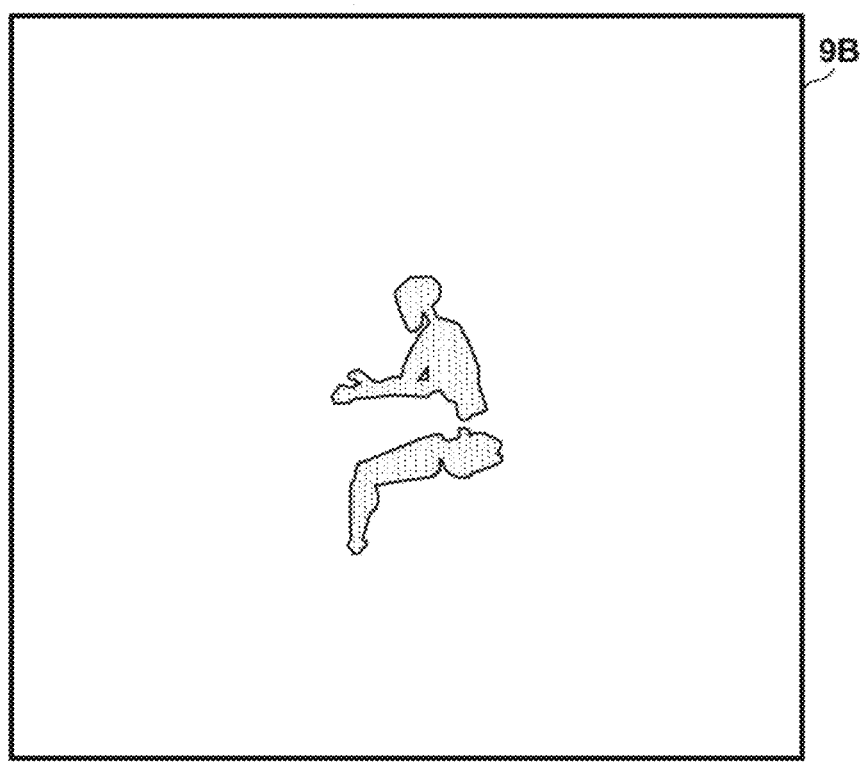
FIG. 4B is a schematic diagram illustrating a driver image.

FIG. 4B is a schematic diagram illustrating the driver image 9B. The driver image 9B is processed with a 3-dimensional coordinate system, and a head, a shoulder, a torso (chest and abdomen), a waist, an arm (upper arm and forearm), a hand, a leg (thigh and lower leg), a foot, and the like can be drawn based on a predetermined human body model, for example. Incidentally, clothing may be further depicted.

Figure 4C:
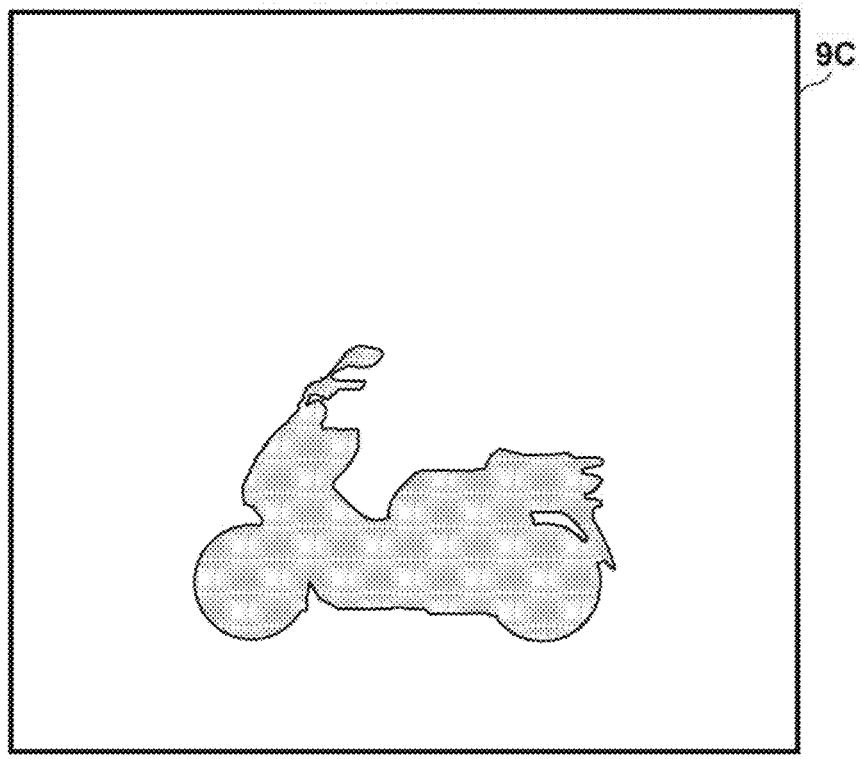
FIG. 4C is a schematic diagram illustrating a vehicle image.

FIG. 4C is a schematic diagram illustrating the vehicle image 9C. The vehicle image 9C is processed with a 3-dimensional coordinate system. For example, an image of the vehicle 1 in a state based on the vehicle information 9$i$ (information indicating a vehicle speed, a steering angle, an attitude of the vehicle body, and a state of a light body) can be drawn. For example, for the vehicle 1 during cornering, the vehicle image 9C can be drawn in an attitude in which the vehicle body is inclined.

Here, since the vehicle information 9$i$ includes information indicating an attitude of the vehicle body, the imaging results by the imaging devices 11A and 11B are preferably corrected according to the degree of inclination of the vehicle body. For example, in a case where the vehicle surrounding image 9A is acquired by the imaging device 11A when the attitude of the vehicle body is inclined at the inclination angle λ1, the image 9A can be rotated by the angle λ1. The correction processing on the imaging results by the imaging devices 11A and 11B may be performed in the image processing device 2 or may be performed in the vehicle 1.

Figure 4D:
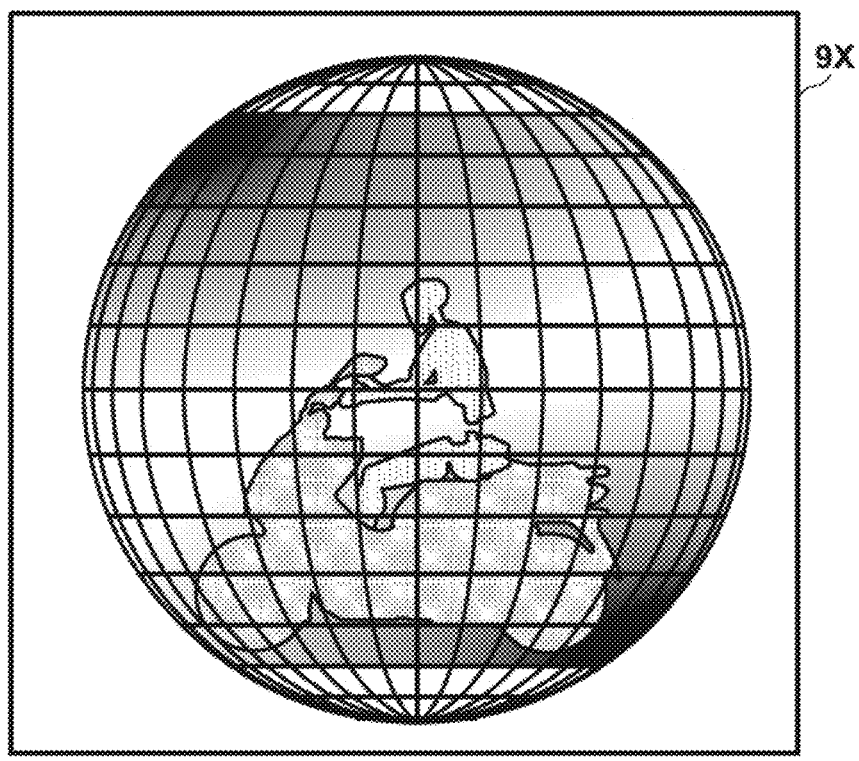
FIG. 4D is a schematic diagram illustrating a composite image.

FIG. 4D is a schematic diagram illustrating the composite image 9X. The images 9A to 9C may be combined such that the coordinate center, the distance, and the direction coincide with each other. The coordinate center is a position immediately above the seat in the present embodiment, but may be another position (for example, any position of the vehicle body) as another embodiment.

Referring again to FIG. 3, in step S1050, the composite image 9X is transmitted to the terminal 3. The user of the terminal 3 can display the composite image 9X on the display unit 33 at a viewpoint (hereinafter referred to as a virtual viewpoint) from any position through an operation input to the operation unit 32. The user can zoom in or out of the composite image 9X through an operation input to the operation unit 32.

Figure 5A:
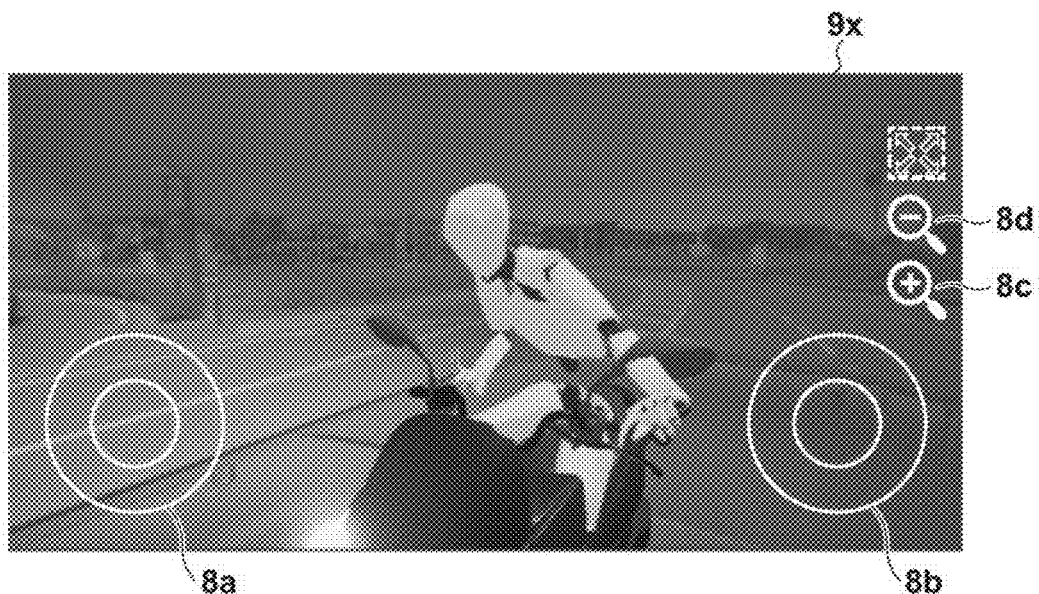
FIG. 5A is a diagram illustrating an example of a composite image at a certain virtual viewpoint.
Figure 5B:
FIG. 5B is a diagram illustrating an example of a composite image at another virtual viewpoint.

FIG. 5A illustrates an example of the composite image 9X in the case of a touch panel type display in which the operation unit 32 and the display unit 33 are integrated. FIG. 5B illustrates another example of the composite image 9X (an example of the composite image 9X at a virtual viewpoint different from FIG. 5A). On the display unit 33, icons 8$a$ and 8$b$ for changing the virtual viewpoint, an icon 8$c$ for zooming in, and an icon 8$d$ for zooming out are displayed as parts of the operation unit 32. By performing a predetermined operation input (for example, a tap operation, a swipe operation, a flick operation, or the like) on these icon 8$a$ or the like, the user can visually recognize the state of the vehicle 1 and the surroundings of the vehicle 1 from a desired virtual viewpoint.

When the virtual viewpoint is changed, the size of the vehicle image 9C in the composite image 9X is changed, and the size of the driver image 9B is also changed incidentally, and thus there is a case where discomfort of a change in the appearance of the composite image 9X with the change is reduced. On the other hand, since the vehicle surrounding image 9A is processed with the spherical coordinate system, the size of the vehicle surrounding image 9A in the composite image 9X may be maintained when the virtual viewpoint is changed.

By setting the distance r in the spherical coordinate system to a relatively large value in image processing of the vehicle surrounding image 9A, it is possible to reduce discomfort (for example, distortion) of a change in the vehicle surrounding image 9A when the virtual viewpoint is changed. In this case, the vehicle surrounding image 9A can be clearly displayed by using the imaging device 11A that has a relatively large number of pixels.

At the foregoing S1040 (the generation of the composite image 9X), the images 9A to 9C are required to show states at substantially the same time. Accordingly, the images 9A to 9C can be associated with attribute information indicating time (a timing at which the image is captured or a timing at which information, based on which the image is generated, is acquired). Incidentally, the images 9A to 9C may be associated with attribute information indicating a location (a location in which the image is captured or a location at which information, based on which the image is generated, is acquired).

As described above, the 3-dimensional coordinate system may typically be indicated by coordinates (x, y, z). The spherical coordinate system may typically be indicated by coordinates (r, θ, φ). Therefore, as another embodiment, by using a known coordinate transformation, the driver image 9B and the vehicle image 9C may be processed with the spherical coordinate system similarly to the vehicle surrounding image 9A. Alternatively, the vehicle surrounding image 9A may be processed with a 3-dimensional coordinate system similarly to the driver image 9B and the vehicle image 9C.

Furthermore, in the present embodiment, a monocular camera is used as the imaging device 111, but a multiocular camera can be alternatively used. As a result, since an imaging target can be imaged together with distance information, the vehicle surrounding image 9A can be processed with the 3-dimensional coordinate system relatively easily.

In the present embodiment, since the vehicle 1 is a straddle type vehicle, the driver image 9B is used in generation of the composite image 9X. However, the driver image 9B need not be used when the vehicle 1 is a passenger vehicle (for example, when it is difficult to visually recognize the driver from the outside of the vehicle). In this case, the imaging device 11B may be omitted.

As described above, according to the present embodiment, the image indicating the situation around the vehicle 1 is acquired as the vehicle surrounding image 9A, and the vehicle information 9$i$ indicating the state of the vehicle 1 is acquired. Thereafter, an image of the vehicle 1 is generated as the vehicle image 9C based on the vehicle information 9$i$. The vehicle image 9C is superimposed on the vehicle surrounding image 9A to generate a composite image 9X. At this time, the driver image 9B may be incidentally superimposed on the vehicle surrounding image 9A. For example, the user (for example, a driver) can visually recognize the situation of the vehicle 1 and the surroundings of the vehicle 1 during driving from a desired virtual viewpoint or can show the situation for a third party by using the composite image 9X. Therefore, according to the present embodiment, the composite image 9X can be used for various applications and, as an example, can be used as a drive recorder indicating a more detailed driving situation.

(Another Example of Image Display System)

According to the above-described image display system SY (see FIG. 1), the functions of the image processing device 2 are realized in a location (for example, a server) different from the vehicle 1, and the display of the composite image 9 and the change in the virtual viewpoint are performed in the terminal 3. However, the present invention is not limited to this mode.

FIG. 6A illustrates an exemplary configuration of an image display system SYa. In the present system SYa, the image processing device 2 is mounted on the vehicle 1. In this case, the transmission of the composite image 9X from the vehicle 1 to the terminal 3 may be performed via the network N, or may be performed by known communication means (for example, Bluetooth (registered trademark)).

Figure 6B:
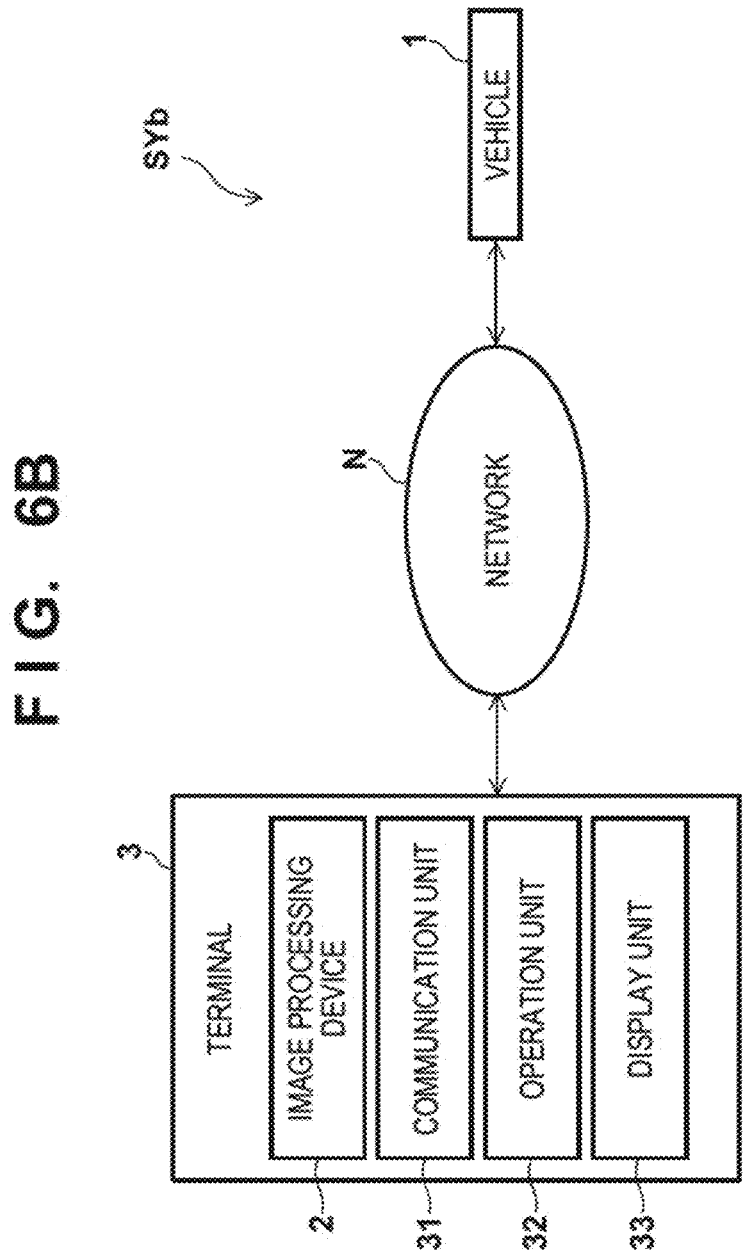
FIG. 6B is a schematic diagram illustrating another exemplary configuration of the image display system.

FIG. 6B illustrates an exemplary configuration of an image display system SYb. In the present system SYb, the image processing device 2 is provided in the terminal 3. That is, the terminal 3 may receive the images 9A and 9B and the vehicle information 9$i$ from the vehicle 1 via the network N or the like, generate the composite image 9X based on the images 9A and 9B and the vehicle information 9$i$, and display the composite image 9X on the display unit 33.

As still another example, the terminal 3 may be an in-vehicle monitor (For example, a car navigation system). In this case, the driver can visually recognize the surrounding situation from a desired virtual viewpoint while driving the vehicle 1.

(Others)

In the above description, to facilitate understanding, each element is indicated by a name related to its functional aspect, but each element is not limited to an element that has the content described in the embodiment as a main function, and may be element that has the content supplementarily.

In the present specification, the vehicle 1 has been exemplified as a typical example. However, the content of the embodiment can be applied to objects not including wheels (vessels and the like), that is, to various movable bodies.

Conclusion of Embodiment

A first aspect is an image processing device (2), processing an image of a vehicle (1), comprising a first acquisition unit (S1000) for acquiring an image showing a situation around the vehicle as a vehicle surrounding image (9A), a second acquisition unit (S1020) for acquiring information (9$i$) indicating a state of the vehicle, and an image generation unit (S1030, S1040) for generating an image of the vehicle as a vehicle image (9C) based on the information acquired by the second acquisition unit and generating a composite image (9X) by superimposing the vehicle image and the driver image on the vehicle surrounding image.

According to the first aspect, the composite image obtained in this way can be utilized for various applications.

Incidentally, according to the first aspect, the third acquisition unit (for example, S1010) for acquiring an image of a driver of the vehicle as a driver image (for example, 9B) is further included, and the image generation unit generates the composite image by further superimposing the driver image on the vehicle surrounding image.

Thus, it is possible to depict a more detailed state in the composite image.

In a second aspect, the image generation unit processes the vehicle surrounding image with a spherical coordinate system.

According to the second aspect, the processing of the vehicle surrounding image can be relatively easily realized.

In a third aspect, the image generation unit processes the vehicle image with a 3-dimensional coordinate system.

According to the third aspect, the processing of the vehicle image can be relatively easily realized.

In a fourth aspect, the image processing device further comprises a transmission unit (S1050) for transmitting the composite image to a predetermined terminal (3), wherein a user of the terminal can display the composite image at a viewpoint from an arbitrary position by an operation input on the terminal.

According to the fourth aspect, the user can visually recognize the state of the vehicle and the surroundings of the vehicle from an arbitrary viewpoint.

In a fifth aspect, the image processing device further comprises a display unit (33, FIG. 5A, FIG. 5B) for displaying the composite image at a viewpoint from an arbitrary position.

According to the fifth aspect, the user can visually recognize the state of the vehicle and the surroundings of the vehicle from an arbitrary viewpoint.

In a sixth aspect, the display unit changes a size of the vehicle image with a change in the viewpoint.

According to the sixth aspect, when the viewpoint is changed, it is possible to reduce discomfort of the change in the composite image accompanying the change in the viewpoint.

In a seventh aspect, the state of the vehicle includes a vehicle speed, a steering angle, an attitude of a vehicle body, and/or a state of a lamp body.

According to the seventh aspect, it is possible to depict a more detailed state in the composite image.

An eighth aspect is a vehicle (1) capable of communicating with the above image processing device, the vehicle comprising a first imaging device (11A) configured to capture an image showing a situation around the vehicle, a detection device (12) configured to detect a state of the vehicle, and a communication device configured to transmit an imaging result from the first imaging device and a detection result from the detection device to the image processing device.

That is, the above-described image processing device can be applied to a known vehicle.

A ninth aspect is a vehicle (1) capable of communicating with the above image processing device, the vehicle comprising a first imaging device (11A) that captures an image showing a situation around the vehicle, a second imaging device (11B) configured to capture an image of the driver, a detection device (12) configured to detect a state of the vehicle, and a communication device (13) configured to transmit an imaging result from the first imaging device, an imaging result from the second imaging device, and a detection result from the detection device to the image processing device.

That is, the above-described image processing device can be applied to a known vehicle.

A tenth aspect is a vehicle (1) comprising the above image processing device, a first imaging device (11A) configured to capture an image showing a situation around the vehicle, and a detection device (12) configured to detect a state of the vehicle.

That is, the above-described image processing device can be applied to a known vehicle.

An eleventh aspect is a vehicle (1) comprising the above image processing device, a first imaging device (11A) configured to capture an image showing a situation around the vehicle, a second imaging device (11B) configured to capture an image of the driver, and a detection device (12) configured to detect a state of the vehicle.

That is, the above-described image processing device can be applied to a known vehicle.

In a twelfth aspect, the vehicle is a straddle type vehicle (1), and the second imaging device is provided in front of and behind the driver's seat.

According to the twelfth aspect, it is possible to appropriately capture an image of the driver.

In a thirteenth aspect, a plurality of the first imaging devices are provided in a surrounding portion of a vehicle body.

According to the thirteenth aspect, the image showing the situation around the vehicle is appropriately captured.

A fourteenth aspect is an image processing method of processing an image of a vehicle (1), the method comprising acquiring (S1000) an image showing a state around the vehicle as a vehicle surrounding image (9A), acquiring (S1020) information (9i) indicating a state of the vehicle, acquiring (S1010) an image of a driver of the vehicle as a driver image (9B), generating (S1030, S1040) an image of the vehicle as a vehicle image (9C) based on the information indicating the state of the vehicle and generating a composite image (9X) by superimposing the vehicle image and the driver image on the vehicle surrounding image, and displaying (33, FIG. 5A, FIG. 5B) the composite image at a viewpoint from an arbitrary position.

According to the fourteenth aspect, the composite image obtained in this way can be used for various applications.

A fifteenth aspect is a program causing a computer to execute each step of the above image processing method.

According to the fifteenth aspect, the above-described image processing method can be implemented on a computer.

The invention is not limited to the foregoing embodiments, and various variations/changes are possible within the spirit of the invention.

The invention claimed is:

1. A vehicle capable of communicating with an image processing device processing an image of the vehicle,
   the image processing device comprising:
   a first acquisition unit for acquiring an image showing a situation around the vehicle as a vehicle surrounding image;
   a second acquisition unit for acquiring information indicating a state of the vehicle;
   a third acquisition unit for acquiring an image of a driver of the vehicle as a driver image; and
   an image generation unit for generating an image of the vehicle as a vehicle image based on the information acquired by the second acquisition unit and generating a composite image by superimposing the vehicle image and the driver image on the vehicle surrounding image, and
   the vehicle comprising:
   a first imaging device that captures an image showing the situation around the vehicle;
   a second imaging device configured to capture the image of the driver;
   a detection device configured to detect the state of the vehicle; and
   a communication device configured to transmit an imaging result from the first imaging device, an imaging result from the second imaging device, and a detection result from the detection device to the image processing device,
   wherein the vehicle is a straddle type vehicle, and the second imaging device is provided in front of and behind the driver's seat.

2. The vehicle according to claim 1, wherein the image generation unit processes the vehicle surrounding image with a spherical coordinate system.

3. The vehicle according to claim 1, wherein the image generation unit processes the vehicle image with a 3-dimensional coordinate system.

4. The vehicle according to claim 1, wherein the image processing device further comprises:
   a transmission unit for transmitting the composite image to a predetermined terminal,
   wherein a user of the terminal can display the composite image at a viewpoint from an arbitrary position by an operation input on the terminal.

5. The vehicle according to claim 1, wherein the image processing device further comprises:
   a display unit for displaying the composite image at a viewpoint from an arbitrary position.

6. The vehicle according to claim 5, wherein the display unit changes a size of the vehicle image with a change in the viewpoint.

7. The vehicle according to claim 1, wherein the state of the vehicle includes a vehicle speed, a steering angle, an attitude of a vehicle body, and/or a state of a lamp body.

8. The vehicle according to claim 1, wherein a plurality of the first imaging devices are provided in a surrounding portion of a vehicle body.

* * * * *